(12) United States Patent
Lachat et al.

(10) Patent No.: US 8,230,579 B2
(45) Date of Patent: Jul. 31, 2012

(54) METHOD FOR PRODUCING AN ELECTROMOTOR

(75) Inventors: Claude Lachat, Le Landeron (CH); Sandro Iervolino, Boudry (CH); Fabien Dachaud, Pontarlier (FR)

(73) Assignee: Etel SA, Motiers (CH)

( * ) Notice: Subject to any disclaimer, the term of this patent is extended or adjusted under 35 U.S.C. 154(b) by 230 days.

(21) Appl. No.: 11/795,992

(22) PCT Filed: Dec. 7, 2005

(86) PCT No.: PCT/EP2005/013076
§ 371 (c)(1),
(2), (4) Date: Jul. 24, 2007

(87) PCT Pub. No.: WO2006/084496
PCT Pub. Date: Aug. 17, 2006

(65) Prior Publication Data
US 2008/0136268 A1 Jun. 12, 2008

(30) Foreign Application Priority Data
Feb. 14, 2005 (CH) ........................................ 242/05

(51) Int. Cl.
*H02K 15/00* (2006.01)
(52) U.S. Cl. ................ 29/596; 29/598; 29/605; 29/606; 29/609
(58) Field of Classification Search ...................... 29/596, 29/598, 605, 606, 609; 310/12, 13, 42, 43, 310/216, 217
See application file for complete search history.

(56) References Cited

U.S. PATENT DOCUMENTS

| | | | | |
|---|---|---|---|---|
| 4,080,724 A | * | 3/1978 | Gillette | ........................... 29/598 |
| 4,665,329 A | | 5/1987 | Raschbichler | |
| 6,509,665 B1 | * | 1/2003 | Nishiyama et al. | ........... 310/215 |
| 2003/0197432 A1 | | 10/2003 | Hashimoto et al. | |
| 2004/0056537 A1 | | 3/2004 | Du et al. | |

FOREIGN PATENT DOCUMENTS

| | | |
|---|---|---|
| CN | 2446712 | 9/2001 |
| DE | 34 00 367 | 5/1984 |
| EP | 0 915 553 | 5/1999 |
| JP | 2-060481 | 5/1990 |

(Continued)

OTHER PUBLICATIONS

International Search Report, PCT International Patent Application No. PCT/EP2005/013076, dated Mar. 16, 2006.

(Continued)

*Primary Examiner* — Thiem Phan
(74) *Attorney, Agent, or Firm* — Kenyon & Kenyon LLP

(57) ABSTRACT

A method for producing an electromotor includes: producing laminated cores to form a segmented part including teeth and grooves, two adjacent laminated cores having a partial tooth at ends arranged at a transition point between the two laminated cores; arranging the laminated cores to form a transition tooth from the partial teeth at the transition point of the two adjacent laminated cores; enclosing of each transition tooth by a transition coil; supplying heat at each transition coil to make adhesive an outer thermoplastic layer surrounding a conductor wire of each transition coil and applying pressure to each transition coil in a direction of a floor of the two grooves surrounding each transition tooth to press together the two partial teeth forming the transition tooth; and hardening the outer thermoplastic layer.

8 Claims, 2 Drawing Sheets

FOREIGN PATENT DOCUMENTS

| | | |
|---|---|---|
| JP | 8-098440 | 4/1996 |
| JP | 2000-037065 | 2/2000 |
| JP | 2001-292542 | 10/2001 |
| JP | 2002-358836 | 12/2002 |
| JP | 2002-359939 | 12/2002 |
| JP | 2003-047229 | 2/2003 |
| JP | 2003-111331 | 4/2003 |
| JP | 2003-169430 | 6/2003 |
| JP | 2003-299342 | 10/2003 |

OTHER PUBLICATIONS

Patent Abstracts of Japan, vol. 2002, No. 02, Apr. 2, 2002.
Patent Abstracts of Japan, vol. 2003, No. 10, Oct. 8, 2003.

* cited by examiner

METHOD FOR PRODUCING AN ELECTROMOTOR

FIELD OF THE INVENTION

The present invention relates to electromotors, in particular linear motors having a segmented part made up of a plurality of elementary laminated cores.

BACKGROUND INFORMATION

According to conventional devices, the segmented part has teeth which project from a base, these teeth forming grooves with one another inside which coils surrounding the teeth are disposed.

The use of elementary laminated cores to form segmented parts of the motor offers a variety of known advantages. In particular, it is possible to produce linear motors whose coil-carrying armature has different lengths but is made of the same elementary laminated cores. However, the production of motor components carrying coils, made up of a plurality of elementary components, requires rigid affixation devices for these elementary components. In particular, to ensure operability of the motor, the elementary components must be held together at their transition points in order to prevent air gaps from forming between these elementary components. Furthermore, the interface surface to the motor must have excellent planarity in order to ensure satisfactory dissipation of the heat generated inside the motor. In the following text, the armature is treated as mobile component only, but example embodiments of the present invention apply to motors having a stationary armature as well.

U.S. Pat. No. 4,665,329 describes a linear motor whose mobile component carrying the coils is made up of a segmented part. The segmented part is formed by a plurality of elementary laminated cores, which form elementary parts. To join individual elementary parts, grooves are placed on the longitudinal surface of the elementary parts on the side opposite the teeth, near the ends. Connecting parts are inserted into two adjacent grooves in the region of each transition tooth. The joining of the elementary parts described in U.S. Pat. No. 4,665,329 has various disadvantages. First of all, it requires the use of specific affixation devices. Furthermore, the two partial teeth forming a transition tooth are not held together since the affixation is implemented only on the top surface of the segmented part located opposite the teeth. In particular, in response to mechanical loading of the segmented part, it is easily possible for the teeth to move apart. This has a detrimental effect on the stability of the mobile part and it also increases the reluctance effect of the motor. In addition, this joining method requires very narrow dimensional tolerances for the mechanical components, which makes them expensive.

SUMMARY

Example embodiments of the present invention avoid the above-referenced disadvantages.

Example embodiments of the present invention provide an electromotor that combines low manufacturing cost with high performance and excellent dynamic properties.

In a method for producing an electromotor according to an example embodiment of the present invention, in particular a synchronous linear motor, which has a segmented part defining teeth and grooves, which carries the coils disposed inside the grooves and surrounding the teeth, the segmented part is formed by a plurality of joined laminated cores or laminated stacks. This method includes:

production of elementary laminated cores to form the segmented part, two adjacent cores having a partial tooth at their ends located at the transition point between two cores;

placement of the elementary laminated cores such that two adjacent laminated cores form at their transition point a transition tooth made up of two partial teeth;

enclosing of each transition tooth by a transition coil;

supply of heat at each transition coil in order to make an outer thermoplastic layer surrounding the conductor wire of each transition coil adhesive, and application of pressure to each transition coil in the direction of the floor of the two grooves surrounding each transition tooth, so that the two individual teeth forming the transition tooth are pressed against each other;

hardening of the material forming the outer layer of the conductor wire.

The unit formed by the segmented part of the motor, as well as the coils may be coated by resin. The resin makes it possible to fix the position of the elementary laminated cores and the coils, and to further stiffen the connection of the elementary laminated cores.

Using the method hereof, it is possible to obtain a segmented part of a motor without additional components specific to the joining of elementary laminated cores, and without particularly precise processing of the transition parts. The cutting of the elementary sheet metals at a right angle is able to be performed with relative ease and precision.

The method may therefore be used to produce segmented motor parts, in particular mobile parts of linear motors, without expensive processing systems being required for this purpose. Furthermore, it is relatively easy to join the elementary parts forming the segmented parts.

In addition, example embodiments of the present invention relate to an electromotor resulting from the afore-described production method.

According to an example embodiment of the present invention, a method for producing an electromotor having a segmented part including teeth and grooves, the segmented part carrying coils arranged in the grooves and enclosing the teeth, the segmented part formed of sheets of metal joined to form a plurality of laminated cores, includes: production elementary laminated cores to form the segmented part, two adjacent laminated cores having a partial tooth at ends arranged at a transition point between the two laminated cores; arranging the elementary laminated cores to form a transition tooth from the partial teeth at the transition point of the two adjacent laminated cores; enclosing of each transition tooth by a transition coil; supplying heat at each transition coil to make adhesive an outer thermoplastic layer surrounding a conductor wire of each transition coil and applying pressure to each transition coil in a direction of a floor of the two grooves surrounding each transition tooth to press together the two partial teeth forming the transition tooth; and hardening the thermoplastic outer layer.

According to an example embodiment of the present invention, a method for producing an electromotor includes: arranging a plurality of laminated cores adjacent to each other to form a segmented part, each laminated core including teeth and grooves located between the teeth, each laminated core formed of sheets of metal, at least one end of each laminated core having a partial tooth, a transition tooth being formed of adjacent partial teeth of each adjacent pair of laminated cores; enclosing each transition tooth by a transition coil, the transition coil including a conductor wire surrounded by an outer thermoplastic layer; supplying heat at each transition coil to make the outer thermoplastic layer adhesive and applying pressure to each transition coil in a direction of a floor of two grooves surrounding each transition tooth to press together the partial teeth; and hardening the thermoplastic layer after the heat-supplying and pressure-applying step.

According to an example embodiment of the present invention, an electromotor includes: a segmented part having teeth and grooves; and coils enclosing the teeth and arranged in the grooves. The segmented part includes a plurality of laminated cores, each laminated core formed of joined sheets of metal, each laminated core including a partial tooth at each end that is opposite to an adjacent laminated core, two adjacent partial teeth forming a transition tooth at a transition between two adjacent laminated cores, each transition tooth enclosed by a transition coil pressed against a floor of the grooves disposed on both sides of the transition tooth, the transition coil pressing the two partial teeth against each other.

In the following text, example embodiments of the present invention are described in greater detail with reference to the appended Figures, which merely serves as an example and should not be considered restrictive.

DETAILED DESCRIPTION

Figure 1A:
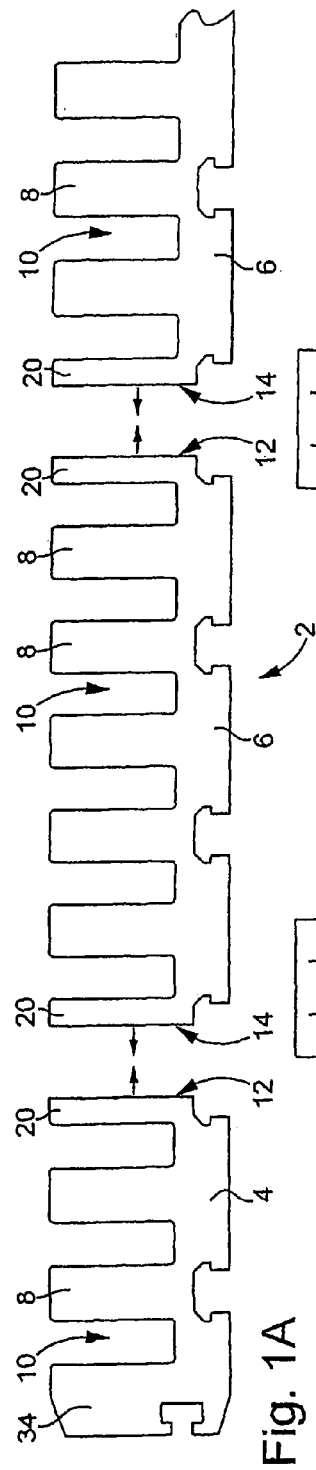
FIGS. 1A, 1B and 1C schematically illustrate a production method of an electromotor according to an example embodiment of the present invention, in particular the joining of the elementary laminated cores of a segmented mobile component of a linear motor.
Figure 1B:
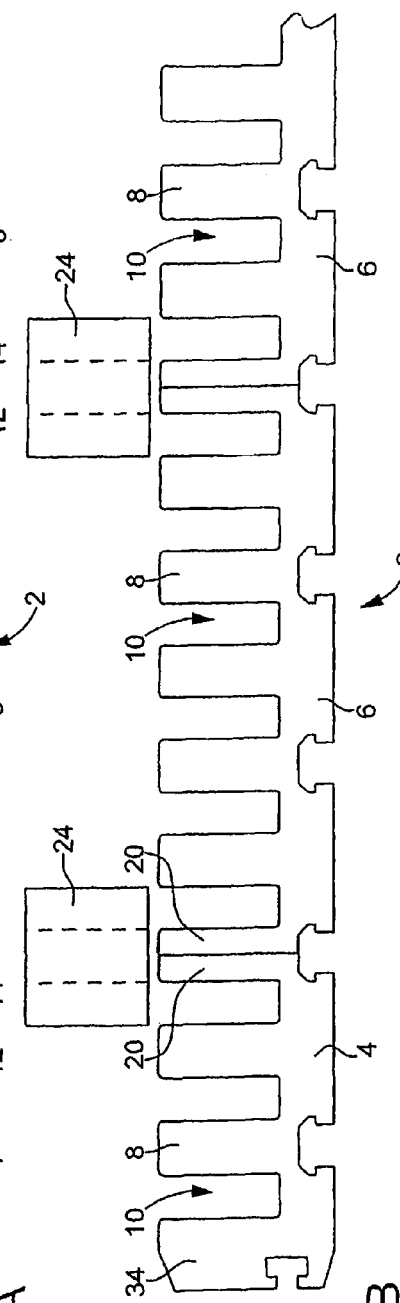
Figure 1C:
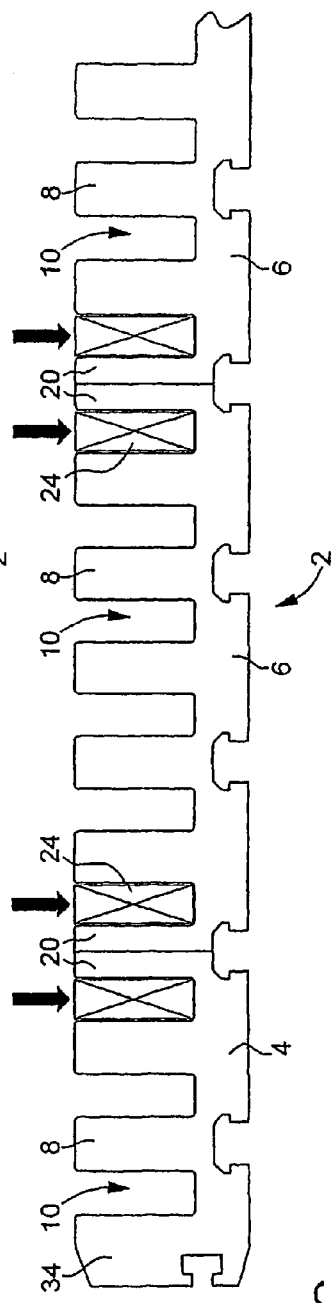

The production method of a linear motor according to an example embodiment of the present invention is described with reference to FIGS. 1A, 1B and 1C. FIGS. 1A, 1B and 1C, and also the following figures, show only the mobile part carrying the coils. Accordingly, the electromotor includes a segmented part 2 made up of a plurality of elementary laminated cores 4 and 6. The elementary laminated cores forming segmented part 2 define teeth 8 and grooves 10. Two adjacently disposed elementary laminated cores each have a partial tooth 20 at their ends 12 and 14 located on the side of the transition between these two elementary laminated cores. As shown in FIG. 1A, elementary laminated cores 4 and 6 are disposed one after the other, so that two adjacent laminated cores have at their transition a transition tooth, which is similar in its dimensions to a tooth 8, this transition tooth being made up of two partial teeth 20 as shown in FIG. 1B. Subsequently, coils are wound around teeth 8, and a transition coil 24 around transition teeth 22. All coils, including the transition coil, may be mechanically identical prior to the assembly.

The coils may be prewound, and each encloses a single tooth of the segmented mobile part after mounting. The manufacturing tolerances are provided such that the coils and transition coils 24, in particular, are able to be inserted into grooves 10 in an uncomplicated manner. The electric wire forming the coil windings may be an enameled copper wire having an outer thermoplastic layer. The enamel layer ensures the electrical insulation of the wire and the imperviousness with respect to humidity and chemicals. The outer thermoplastic layer has the characteristic of becoming adhesive under the action of heat and thereby allows the fusing of the coils. Once transition coils 24 have been wound around transition teeth 22 or mounted thereon as shown in FIG. 1C, heat is conveyed to at least each transition coil so that the material of the outer layer becomes adhesive. To this end, it may be provided to heat the coil with the aid of an electrical current supplied to the coil, which is sufficient to heat it and to reach the fusing temperature of the outer thermoplastic layer. At the same time and/or immediately after supplying the heat, the transition coil is subjected to pressure in the direction of the floor of the two grooves disposed on both sides of the transition tooth wound with this transition coil. During this process the elementary laminated cores are pressed against each other, and the lower transition plane is kept completely flat. A compact mass forms due to the pressure exerted on the preheated coil, which is made up of the enameled copper and the outer fusing layer, which covers both flanks of the transition teeth.

Figure 2:
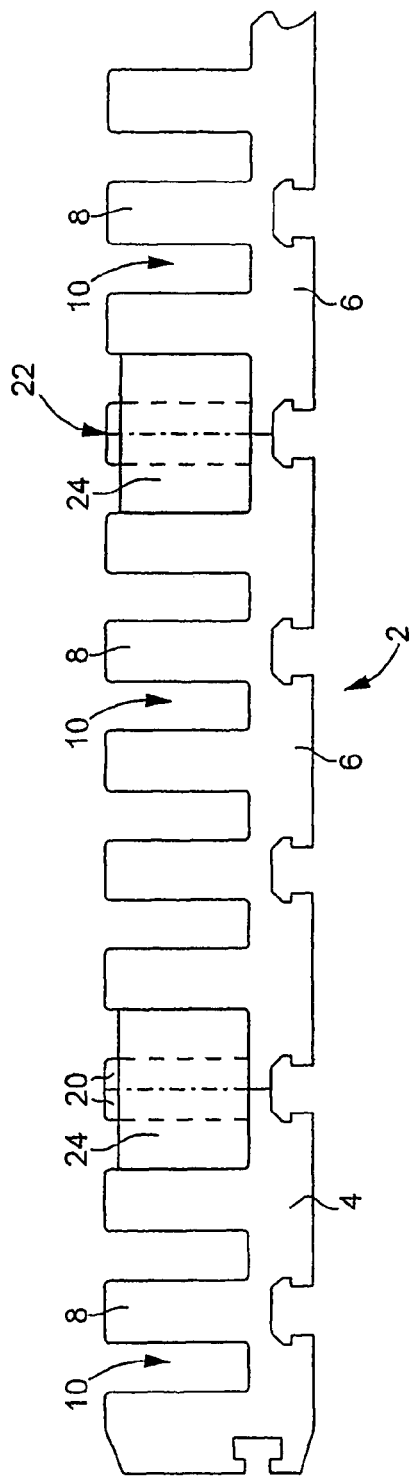
FIG. 2 is a schematic view of a motor according to an example embodiment of the present invention, produced with the aid of the method illustrated in FIGS. 1A, 1B and 1C.

The material of the outer thermoplastic layer hardens when it cools and thus keeps the two partial teeth 20 forming a transition tooth 22 together in a rigid manner. The obtained structure is robust and impervious to thermal loading, in particular due to stretching and mechanical loading. The mobile part of the motor produced according to the aforedescribed method is shown in FIG. 2 in a cutaway view.

The utilization of the method hereof results in efficient fusing only with the coils wound around the teeth of the mobile part. Since the heated transition coil is pressed in the direction of the floor of the grooves in which it is accommodated, the copper fill factor of the groove is able to be increased to more than 85%, and the thermal resistivity is reduced for heat dissipation via the segmented mobile part, thereby increasing the output of the linear motor.

For a uniform increase in the groove fill factor, the coils wound around the teeth of the segmented mobile part are pressed into the grooves in which they are accommodated, e.g., in their warm state. The original dimensions of the coils are selected such that the height of the coils is optimal for the motor once the coils have been pressed into the grooves.

The joining of elementary laminated cores for the purpose of forming the segmented mobile part according to the aforedescribed method makes it possible to achieve sufficient rigidity, and it is possible to increase this rigidity even further by coating the segmented mobile part and the coils with resin, which retains the coils in their position. The resin is selected so as to ensure excellent heat dissipation during operation of the electromotor.

As shown in FIG. 2, the mobile part of the linear motor is made up of a segmented part 2 formed by elementary sheet metal components 4 and 6, which have teeth 8 and partial teeth 20 that form transition teeth 22. A transition coil 24, in particular, is wound around each transition tooth 22. The transition coil is pressed in the direction of the floor of grooves 10 in its warm state, i.e., once the material of the outer layer has become adhesive. In this manner, it is possible to obtain mobile parts of the linear motor having different lengths using only two different elementary laminated cores 4 and 6. Core 4 defines an end element or an end part, while core 6 defines a center element or an internal part, i.e., an element arranged between two laminated cores 4. The center elements may have the same length, and the end parts have an end tooth 34 may have a specific profile. The segmented part and the coils are coated, e.g., with resin, for reinforcement and dissipation of the heat generated by the coils during engine operation.

Figure 3:
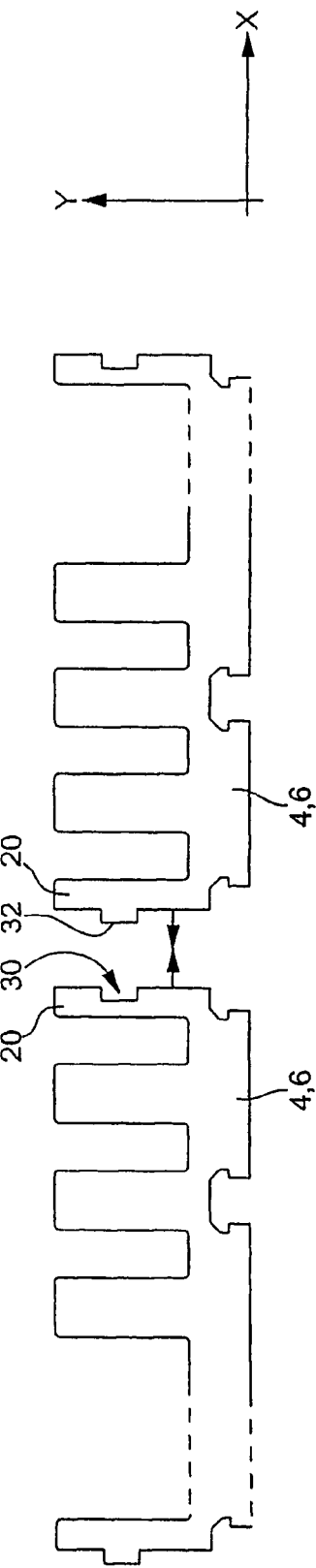
FIG. 3 illustrates a variant of the motor illustrated in FIG. 2.

FIG. 3 shows a cutaway view of a variant of an electromotor according to an example embodiment of the present invention. This variant is characterized in that the two partial teeth 20 forming a transition tooth 22 have positioning arrangement 30,32 corresponding to a Y-direction, which extends transversely to a longitudinal X-direction of the segmented part. The positioning arrangement in this variant is formed by a groove 30 provided on the outer transverse surface of one of the two partial teeth, and by a corresponding projection 32 provided on the outer transverse surface of the other partial tooth. This ensures the alignment of the elementary laminated cores, and the outer surfaces of the partial teeth forming a transition tooth are unable to shift with respect to each other in the transverse Y-direction.

What is claimed is:

1. A method for producing an electromotor having a segmented part including teeth and grooves, the segmented part carrying coils arranged in the grooves and enclosing the teeth, the segmented part formed of sheets of metal joined to form a plurality of laminated cores, comprising:

producing laminated cores to form the segmented part, two adjacent laminated cores having a partial tooth at ends arranged at a transition point between the two laminated cores;

arranging the laminated cores to form a transition tooth from the partial teeth at the transition point of the two adjacent laminated cores;

enclosing of each transition tooth by a transition coil;

supplying heat at each transition coil to make adhesive an outer thermoplastic layer surrounding a conductor wire of each transition coil and applying pressure to each transition coil in a direction of a floor of the two grooves surrounding each transition tooth to press together the two partial teeth forming the transition tooth; and hardening the outer thermoplastic layer;

wherein the electromotor is arranged as a linear motor.

2. The method according to claim 1, wherein outer transverse surfaces of the partial teeth are configured to ensure relative positioning of two partial teeth to form the transition tooth.

3. The method according to claim 1, wherein outer transverse surfaces of the partial teeth include positioning structures configured to ensure relative positioning of the partial teeth to form the transition tooth.

4. The method according to claim 1, wherein outer transverse surfaces of the partial teeth including positioning means for ensuring relative positioning of the partial teeth to form the transition tooth.

5. The method according to claim 1, wherein the transition coil includes an enameled copper wire enclosed by the outer thermoplastic layer.

6. The method according to claim 1, further comprising coating with resin the segmented part and the coils disposed inside the grooves.

7. The method according to claim 1, wherein the applying of pressure is performed at least one of (a) during and (b) immediately after the supplying of heat.

8. A method for producing an electromotor, comprising:

arranging a plurality of laminated cores adjacent to each other to form a segmented part, each laminated core including teeth and grooves located between the teeth, each laminated core formed of sheets of metal, at least one end of each laminated core having a partial tooth, a transition tooth being formed of adjacent partial teeth of each adjacent pair of laminated cores;

enclosing each transition tooth by a transition coil, the transition coil including a conductor wire surrounded by an outer thermoplastic layer;

supplying heat at each transition coil to make the outer thermoplastic layer adhesive and applying pressure to each transition coil in a direction of a floor of two grooves surrounding each transition tooth to press together the partial teeth; and hardening the thermoplastic layer after the heat-supplying and pressure-applying step;

wherein the electromotor is arranged as a linear motor.

* * * * *